United States Patent Office 3,040,672
Patented June 26, 1962

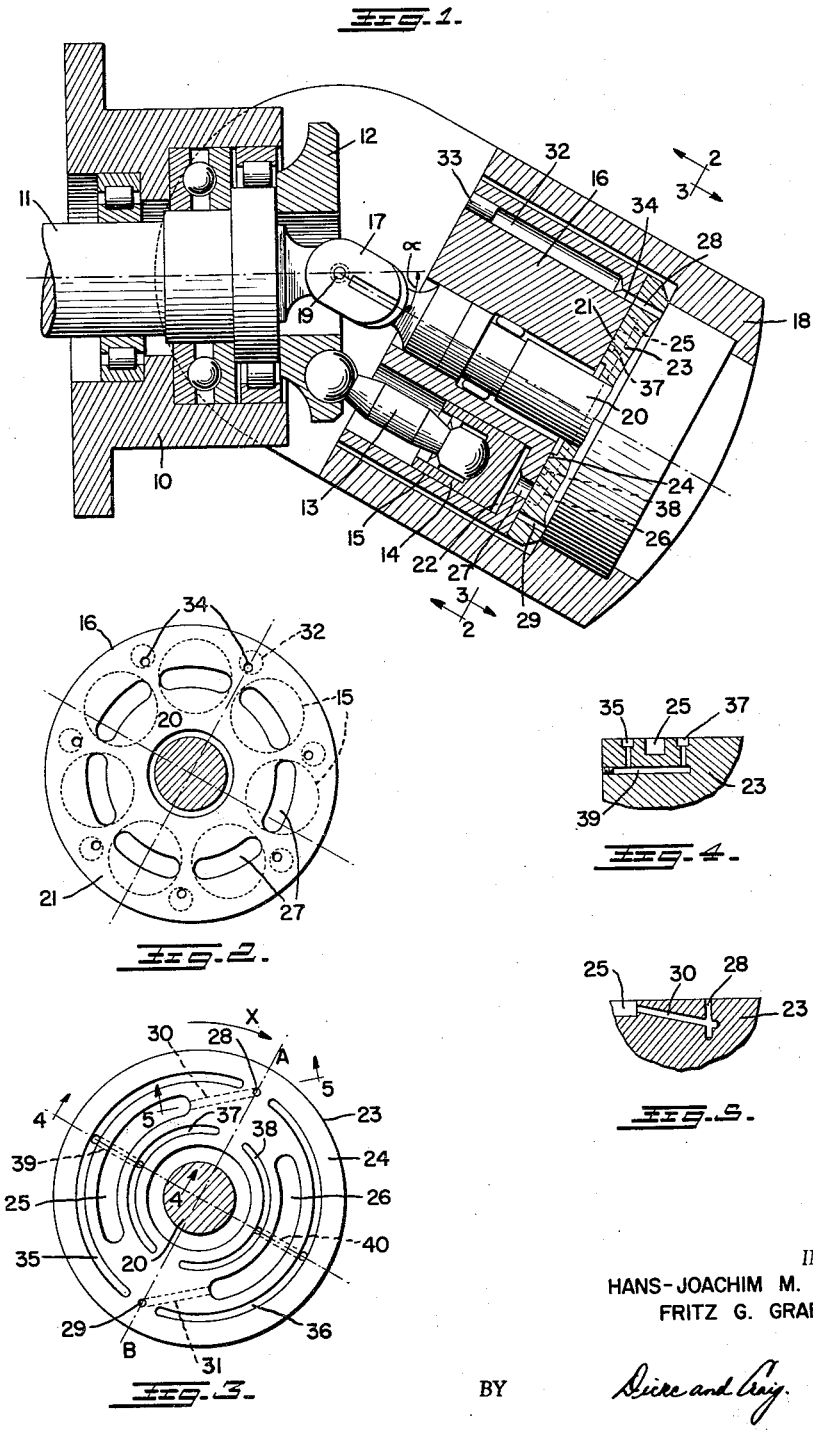

3,040,672
LUBRICATING SYSTEM FOR CONTROL SURFACES OF A HYDROSTATIC TRANSMISSION
Hans-Joachim M. Foerster, Stuttgart-Bad Cannstatt, and Fritz G. Grabow, Stuttgart-Unterturkheim, Germany, assignors to Daimler-Benz Aktiengesellschaft, Stuttgart-Unterturkheim, Germany
Filed Oct. 5, 1956, Ser. No. 614,290
Claims priority, application Germany Oct. 5, 1955
5 Claims. (Cl. 103—162)

The present invention relates to a lubricating system for the control bearing surfaces of a hydrostatic transmission, in which a transmission member, which, for example, contains the working pistons of the transmission, is supported with relatively strong axial forces on a bearing end surface forming a control or valving surface of the transmission. This bearing surface is subjected to extraordinarily high loads as a result of the large forces and the unusually high rotational speed with which the transmission members rotate on the bearing end surface.

Accordingly, it is an object of the present invention to provide a particularly effective lubrication in which the bearing surfaces which rotate upon each other are reliably separated by a lubricating film produced by an appropriate control and distribution of a lubricating oil which is under high pressure.

Accordingly, the present invention consists in that one or preferably several oil reservoir chambers which are arranged in the rotating transmission member are brought into communication during each rotation of the transmission member with the hydraulic working medium or oil, which is under pressure, and are thereby charged or filled with such hydraulic medium or oil, and are thereupon connected with the lubricating grooves or the like which are arranged in the bearing end surface for purposes of discharging the oil compressed in the oil reservoir chambers.

Preferably, the oil reservoir chambers are each connected in or near the dead center points between the pressure side and the suction side of the bearing end surface with a pressure space containing the working oil or hydraulic medium. Furthermore, the bearing end surface which does not rotate and which includes, for example, reniform or bow-shaped pressure or suction spaces, is provided in the dead center position of the working pistons with an aperture connected with the pressure space which is overrun sequentially by each of the oil reservoir chambers, while, at the same time, a lubricating groove is provided along the same radial distance which is separate from the aperture and which extends either partly or entirely over the remaining circumference to the opposite dead center point, into which the oil reservoir chambers, after being overrun by the aforementioned apertures, discharge the stored pressure oil.

The present invention provides the possibility of introducing lubricating oil under high pressure and in definite metered quantities between the rotating end surfaces of the transmission member and of the pressure bearing and to prevent thereby direct contact between the metallic surfaces which rotate relative to each other.

If so desired, several grooves, for example, reniform or bow-shaped or of annular shape, which are connected with each other, may be distributed over the bearing surface. The oil reservoir chambers may be formed appropriately as axially extending bores between the cylinders of the working pistons of the hydrostatic transmission, and may discharge, for example, through narrow throttle apertures into the control surface.

Accordingly, it is an object of the present invention to provide a lubricating system for the bearing surfaces of the parts of a hydrostatic transmission which rotate relative to each other, which is effective, simple in construction, and which prevents direct contact of the metallic bearing surfaces during rotation of the transmission parts by the use of an oil film therebetween obtained from the working fluid of the transmission.

Another object of the present invention is to provide such a lubrication system for the bearing surfaces of a hydrostatic transmission as will assure a constant lubricating film of predetermined quantity between the metallic bearing surfaces so as to prevent direct bearing contact between the same.

Another object of the present invention resides in the provision of such a lubricating system in connection with hydrostatic transmissions which utilizes the hydraulic medium or working oil subjected to high pressures in the transmission for purposes of providing adequate lubricating between the bearing surfaces.

A still further object of the present invention is the provision of such a lubricating system in hydrostatic transmissions as will assure predetermined metered quantities of lubricating oil to be supplied to the bearing surfaces by first connecting during each rotation of the rotatable transmission member one or several oil reservoir chambers with the system containing the hydraulic medium or working oil, thereupon disconnecting each of the oil reservoir chambers, and then discharging the compressed oil stored in these chambers through appropriately provided lubricating grooves which are disposed in the bearing plate of the transmission.

These and other objects, features and advantages of the present invention will become more obvious from the following description when taken in connection with the accompanying drawing, which shows, for purposes of illustration only, one preferred embodiment in accordance with the present invention and wherein:

FIGURE 1 is an axial cross-sectional view through a hydrostatic transmission provided with a lubricating system in accordance with the present invention, FIGURE 2 is a cross-sectional view taken along line 2—2 of FIGURE 1, FIGURE 3 is a cross-sectional view taken along line 3—3 of FIGURE 1, FIGURE 4 is a cross-sectional view taken along line 4—4 of FIGURE 3, and FIGURE 5 is a cross-sectional view taken along line 5—5 of FIGURE 3.

Referring now more particularly to the drawing, wherein like reference numerals are used throughout the various views of the drawing to designate like parts, reference numeral 11 indicates the drive shaft of the hydrostatic transmission which is suitably journalled in the stationary housing 10 of the transmission. A flange member 12 is rigidly secured to the end of the drive shaft 11. The flange member 12 serves to support and take along the piston rods 13. The piston rods 13 are articulately connected at the other ends thereof with the working pistons 14, which are reciprocable in the cylinders 15 of the drum or barrel shaped transmission member 16. For purposes of clarity, only one of the piston rods 13, working pistons 14, and cylinders 15 are illustrated in the drawing. However, it is understood that any suitable member of pistons may be provided therein.

A universal joint coupling indicated in the drawing at 17 serves for purposes of centering and coupling the transmission member 16 with the drive shaft 11 in such a manner that the transmission member 16 together with the non-rotating housing 18 which receives the transmission member 16 may be pivoted or slued about a cross axis 19 of the coupling joint 17 relative to the stationary housing 10. The transmission member 16, for that purpose, is rotatably journalled on a pin 20 in the pivotal housing 18 and is supported by means of the supporting or bearing end surface 21 thereof in the axial direction against the bearing end surface 24 of a bearing pressure plate 23 to absorb the axial forces which occur in the pressure or working spaces 22 of the cylinders 15.

The bearing pressure plate 23 serves simultaneously as control valving member for the supply or discharge of the working oil into or from the pressure or working spaces 22. For that purpose, the bearing pressure plate 23 is provided at the end surface 24 thereof with reniform or bow-shaped recesses 25 and 26 respectively in such a manner that, depending on the direction of rotation of the drive shaft 11, one of the two control spaces 25 or 26 serves as pressure space and the other as suction space in that the control spaces 25 and 26 are overrun by the bores or slots 27 of the pressure or working spaces 22 during inward or outward movement of the pistons 14. The control spaces or channels 25 and 26 are thereby connected in any suitable known manner with the line or conduit system of the working oil or with the other aggregate of the transmission consisting of pump and motor.

In accordance with the present invention, apertures or bores 28 and 29 are provided in the bearing pressure plate 23 within the region of the two dead center points A and B in such a manner that the bore 28 is connected within the plate 23 with the control space 25 through a cross bore 30 and the bore 29 is similarly connected with the control space 26 through a cross bore 31. The dead center points A and B are diametrically opposite each other relative the rotational axis of the transmission member 16 and lie in a plane that includes this axis and is normal to the cross axis 19.

Moreover, in accordance with the present invention, oil reservoir chambers 32 are arranged in the transmission member 16, and more particularly, are formed by bores parallel to the axis of the member 16 and parallel to the axes of the cylinders 15 and in the spaces or corners formed therebetween at points spaced circumferentially or angularly about the axis of the transmission member 16. At the ends of the oil reservoir chambers 32 nearer the drive shaft 11, the oil reservoir chambers 32 are closed off in any suitable manner, for example, by studs 33. At the opposite ends thereof, the oil reservoir chambers 32 discharge into the end surface 21 of the transmission member 16 through restricted apertures 34. The bores 34 are thereby arranged at the same radial distance relative the rotational axis of the transmission members 16 as the bores 28 and 29 in the bearing pressure plate 23 so that during rotation of the transmission member 16 the bores 34 are sequentially and alternately overrun and thereby valve the bores 28 and 29 respectively.

Lubricating grooves 35 and 36 are arranged on the same radius as the bores 28 and 29, on the one hand, and as the bores 34, on the other, which grooves 35 and 36 extend essentially semi-circularly and which shield the control spaces 25 and 26 toward the outside thereof. The grooves 35 and 36 extend circumferentially or angularly beyond the ends of the respective control spaces 25 and 26.

The lubricating grooves 37 and 38 proceed in a similar manner inwardly of the control spaces 25 and 26, and are connected with the outer control grooves 35 and 36 through the cross channels 39 and 40 which bridge or by-pass the control spaces 25 and 26 underneath the latter.

Operation

The operation of the lubricating system in accordance with the present invention is as follows:

Upon driving the drive shaft 11, the working pistons 14 are reciprocated in the axial direction with a larger or smaller stroke depending on the angular position α of the transmission member 16. If the direction of rotation of the transmission member 16 which operates as a pump is indicated by the arrow x (FIGURE 3) then the control space 25 is operative as suction space and the control space 26 as pressure space in that the working pistons 14 carry out the pressure stroke thereof in the direction of rotation from the dead center point A to the dead center point B and carry out the suction stroke thereof from the dead center position B to the dead center position A.

It is understood, of course, that if the illustrated arrangement operates as transmission motor, then the control space 25 represents the pressure space and the control space 26 the suction space.

In each of the two dead center positions A and B the bores 28 and 29 are overrun by the throttling apertures 34 of the oil reservoir chambers 32. As a result thereof, each of the oil reservoir chambers 32 is connected in one of the two dead center positions, for example, in the dead center position B, over the corresponding bore, for example, bore 29, with the pressure space, for instance, space 26, and is thereby filled with oil which is under high pressure, whereby the oil is compressed in the chambers 32 as a result of the high pressure.

Upon further rotation of the drive shaft 11 and therewith of the transmission member 16, the bore 34 under consideration is thereupon disconnected again from the control bore 29, whereby the oil remains in the corresponding oil reservoir chamber 32 in its highly compressed condition until the bore 34 is overrun or valved by the control groove 35 or 36 respectively. At that instant, the oil is discharged from the chamber 32 and, depending on the previous compression thereof, discharges the excess oil into the lubricating groove 36 or 35 whereby the oil may at the same time reach the inward lubricating grooves 38 and 37 over the cross bores 40 and 39 from grooves 36 and 35 respectively. If the lubricating grooves extend over the end surfaces of the bearing pressure plate 23 over a sufficiently large extent then a continuous oil film will be produced on the end surface which prevents direct contact between the metallic bearing surfaces 21 and 24.

A corresponding effect occurs also in principle when one of the bores 34 is overrun by a corresponding control bore 28 even though in that case the effect is of lesser degree owing to the fact that the connection of the control bore 28 is with the suction space 25 of the transmission. Whereas, for example, the pressure side of the transmission may operate with pressures of several hundred atmospheres absolute pressure, the pressure on the suction side may only be of one or several atmospheres absolute pressure. However, insofar as the present invention is concerned, the suction side will operate for purposes of the lubricating system in accordance with the present invention as a pressure side even though the effect is much less.

While we have shown and described one preferred embodiment in accordance with the present invention, it is understood that the same is not limited thereto but is susceptible of many changes and modifications within the spirit of the present invention and we intend to cover all such changes and modifications except as defined by the appended claims.

We claim:

1. A lubricating system for the control bearing surfaces of a hydrostatic transmission using a hydraulic medium under pressure comprising a rotatable transmission member having a plurality of cylinders disposed about the rotational axis of said member, a piston movable in each of said cylinders and defining with the cylinder a workspace, said rotatable member having an end surface, a bearing pressure plate having an end surface for supporting thereon the end surface of said rotatable transmission member, said bearing plate having a plurality of arcuately-extending control spaces for the hydraulic medium in the end surface thereof, one of said control spaces receiving low pressure fluid and a second control space delivering high pressure fluid, said rotatable member having means defining apertures in the end surface thereof connecting with said control spaces during rotation of said member to receive and discharge hydraulic medium into and from said workspaces in accordance with reciprocation of said pistons, oil reservoir means in said rotatable member, first and second ports in the end surface of said plate, said ports being so disposed as to communicate with said reservoir means during rotation of said member, said first port being in communication with said low pressure control space, said second port receiving high pressure fluid from said second control space, lubrication groove means comprising pairs of concentric grooves disposed radially on either side of said control spaces, each of said grooves being of greater arcuate extent than each of said control spaces said oil reservoir means supplying high pressure fluid to the outer ones of said concentric grooves during said rotation.

2. A lubricating system according to claim 1, wherein said control spaces comprise circumferentially spaced pressure and suction spaces, said first and second ports being located on a line extending radially from said axis between said pressure and suction spaces.

3. A lubricating system according to claim 1, in which each of said pairs of concentric grooves comprise an arcuate groove concentric with said axis, said arcuate groove and said first and second ports being disposed at the same radial distance from said axis.

4. A lubricating system according to claim 1 wherein said outer ones of said concentric grooves are substantially semi-circular and extend substantially to said first and second ports in said bearing plate.

5. A lubrication system according to claim 1, wherein said lubricating groove means include channel means disposed within said bearing member connecting the concentric grooves constituting each of said pairs.

References Cited in the file of this patent

UNITED STATES PATENTS

| | | |
|---|---|---|
| 2,155,455 | Thoma | Apr. 25, 1939 |
| 2,272,771 | Hawley | Feb. 10, 1942 |
| 2,288,768 | Zimmerman | July 7, 1942 |
| 2,297,518 | Wegerdt | Sept. 29, 1942 |
| 2,298,850 | Vickers | Oct. 13, 1942 |
| 2,553,655 | Herman et al. | May 22, 1951 |

FOREIGN PATENTS

| | | |
|---|---|---|
| 20,671 | Germany (Cl. 59a14) | June 16, 1955 |
| 169,478 | Austria | Nov. 26, 1951 |